United States Patent Office 2,826,077
Patented Mar. 11, 1958

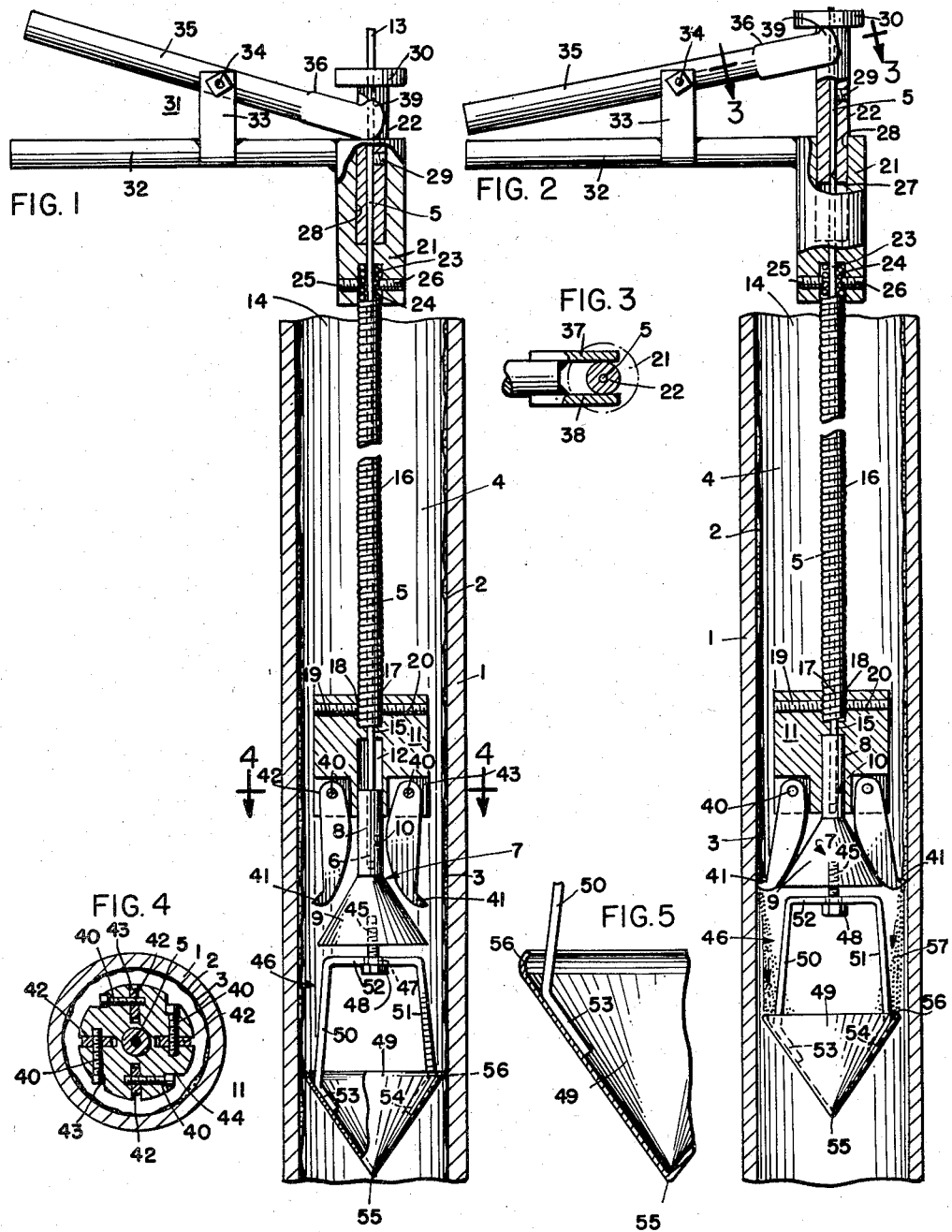

2,826,077

SAMPLING APPARATUS

Alfred O. Walker, Westchester, Ill., assignor to National Aluminate Corporation, Chicago, Ill., a corporation of Delaware Application May 27, 1953, Serial No. 357,847

4 Claims. (Cl. 73—425.2)

This invention relates to apparatus for obtaining samples of scale, incrustation or other deposits and more particularly to a device capable of reaching the interior of a pipe or conduit so that representative samples of deposits upon the interior surface of the pipe may be obtained.

A common problem occurring in piping systems is the formation of scale or other deposits upon the inner surfaces of the piping, tubing or conduits used in the system. Such deposits usually form either by precipitation of substances from the fluid that is conducted by the piping or by the corrosion of the piping. The presence of corrosion or scale and the elimination thereof in water piping systems, for instance, necessarily entails a study of the interior surfaces of the piping comprising the system so that proper preventative measures can be undertaken in the treatment of the water. An assay of the deposit formed on the inner surface of the piping assists in determining the program that must be pursued in order to eliminate or abate the condition by treatment of the water before it is circulated into the piping system. Since each case is an individual problem and must be studied with particular reference to local experience and composition of the water or other fluid circulating in the pipe, it is desirable to have a sampling device of general utility in various types of piping systems.

An object of the invention is the provision of a sampling apparatus for obtaining samples of a deposit in a generally inaccessible area within a pipe or conduit.

Another object of the invention is the provision of a sampling device having a manual control which makes it possible to collect a sample of scale or other deposit at a predetermined point in a pipe.

A still further object of the invention is the provision of a sampling device having a cone-shaped cam member that imparts a uniform arcuate movement to a series of scraping elements and a container having a loose fit with respect to the cam member which collects scale samplings removed from a surface upon which the scraping elements operate.

Another object of the invention is the provision of a sampling apparatus of the type described having a loosely mounted sample container which is so designed that the container may ride over the irregular surfaces of an encrusted or corroded piping wall.

Another object of the invention is the provision of a lever that operates a cable for a specified distance whereby a uniform scraping force is directed upon the interior walls of a pipe for a predetermined distance so that representative standardized samples of deposits from the walls may be obtained.

Another object of the invention is the provision of a device of the type described comprising a flexible cable having an end that is operative upon a cam member associated with scraping elements and an opposite end secured to a lever in an arrangement whereby movement of the lever actuates the cam member and the associated scraping elements and spring means for returning the cam to an initial or pre-scraping position.

Other objects and advantages of the invention will become apparent upon reading the following description taken in conjunction with the accompanying drawing, in which:

Fig. 1 is a side elevational view of the scale sampling apparatus comprising the invention showing its relationship in a pre-scraping position to a pipe in section from which a sample of scale or other deposit is to be taken;

Fig. 2 is a view similar to Fig. 1 wherein the apparatus is shown in the process of sample procurement;

Fig. 3 is a cross-sectional view taken along the lines 3—3 of Fig. 2 showing the bifurcated end of the lever and the plunger member through which the cable is threaded;

Fig. 4 is a cross-sectional view taken along the lines 4—4 of Fig. 1 showing how the scraping members are pivotally connected to the device;

Fig. 5 is an enlarged detail view with parts broken away of the scale collecting container.

The invention herein described comprises a device that may be inserted into a pipe opening for a predetermined distance within the pipe whereby a sample of the deposit or other formation at the desired point may be readily obtained. The apparatus comprises a cable having a series of scraping fingers adjacent the cable end to be inserted into the pipe. A cam element is connected to said cable adjacent said scraping fingers. The opposite end of the cable is connected to a manually operated lever adapted to move the cable axially of the pipe. As the cable is moved axially by manipulation of the lever the cam member adjacent the scraping fingers is correspondingly moved to cam the scraping fingers into contact with the interior surface of the pipe to cause a sample of scale or other formation to be scraped from the interior of the pipe. The scale or other deposit which is loosened from the area engaged by the fingers collects in a container disposed adjacent the fingers.

Figures 1 and 2 show a length of pipe or conduit 1 having formed on the interior surface 2 thereof an encrusted layer or deposit 3. The layer 3 may represent, for example, either a deposit effected by the fluid passing through the pipe or a corrosion product of the pipe. Disposed within the interior 4 of the pipe 1 is a cable 5 which may be formed of any suitable flexible material such as a heavy wire or a steel rod. The cable 5 is secured at its lower or operative end 6 to a funnel-shaped member 7 consisting of a stem 8 and a cone-shaped cam member 9. The end 6 of the cable 5 is secured to the stem 8 of the funnel-shaped member 7 by means of set screw 10.

Surrounding a portion of the stem 8 is a cylindrical scraper support member 11. The stem 8, as will be described later, is freely movable within the recess 12 (Fig. 1) of the support member 11. The end 13 of the cable 5 is outside open end 14 of pipe 1.

The cable 5 passes through an opening 15 in the support 11 and is protected by a coiled wire flexible conduit 16. The flexible conduit 16 should be sufficiently rigid to permit it to be pushed into a pipe without buckling but at the same time should be flexible enough to go around bends and deviations in the pipe. The flexible conduit 16 is inserted at one end 17 within the recess 18 of the bearing member 11. The end 17 of the flexible conduit 16 is secured to the bearing member 11 by means of set screws 19 and 20.

Figures 1 and 2 are broken away to show the outer end 23 of the flexible conduit 16 whereby it can be seen that the end 23 of the flexible conduit 16 is secured within the recess 24 of the tubular sleeve member 21 by means of set screws 25 and 26. The sleeve member 21 is generally H-shaped in cross-section. A recess 28 (Fig. 2) is formed in sleeve 21 to receive the plunger member 22 having a bore axially generally shown at 27 the length thereof so as to receive the cable 5. A set screw 29 secures the cable 5 to plunger 22 at whatever point may be desired for proper adjustment of the device.

The plunger 22 terminates at its upper end in a cap 30 upon which the force of the lever mechanism 31 is directed. The lever mechanism comprises an arm or handle 32. Medially of the handle 32 is a perpendicular fulcrum member 33 upon which is mounted a bolt member 34 which serves as a pivot for lever 35. The lever 35 is bifurcated at end 36 into the arms 37 and 38 (Fig. 3). Each of the arms 37 and 38 terminates in a rounded lip 39.

When the outer end of lever 35 is moved toward arm 32 around pivot 34 the bifurcated end 36 is moved so that the lip 39 of each of the arms 37 and 38 contacts the under surface of the cap 30 of the plunger 22. The pre-scraper position is shown in Fig. 1. In Fig. 2 the lever has been moved toward lever 32 thereby moving the plunger 22 outwardly from within the recess 28 of the sleeve member 21. Since the cable 5 is secured to the plunger 22 by means of the set screw 29 the cable is moved a distance corresponding to the movement of the plunger member 22 within its associated recess 28 of the sleeve 21. A corresponding movement will consequently be directed upon the end 6 of the cable. Since cable end 6 is secured to the stem 8 of the funnel-shaped member 7 by set screw 10, the member 7 will move with the cable and the stem 8 will move within the recess 12 from the position shown in Fig. 1 to that shown in Fig. 2. The cam member 9 will move correspondingly and in the course of its movement will cam the scraper members 42 outwardly causing them to move arcuately from their downwardly depending position shown in Fig. 1 to the scraping position shown in Fig. 2 wherein the edge or tooth 41 that characterizes each of the scraper members bites into the deposit 3 on the inside of the pipe.

The scraper members are pivotally mounted in the scraper support member 11 by machine screws 40. The support member 11 is recessed as at 43 and 44 (Figs. 1, 2 and 4) to permit the pivotal movement of the scraper members 42 when actuated by the cam member 9.

Secured to the under surface of the cam member 9 is a bolt 45 which supports a yoke 46. The bore 47 in the yoke is larger than the body of the bolt permitting the yoke to wobble on the bolt head 48 which supports the yoke. The sample container 49 is affixed to arms 50 and 51 that depend downwardly from the cross member 52 of yoke 46. The arms 50 and 51 are bent inwardly and the flanges 53 and 54 that are so formed are secured to the inner surface of the sides of the container 49 by welding or other suitable means.

The container 49 is generally cone-shaped, has an apical portion 55, and a rounded edge or rim 56 at the base of the cone. The rounded edge 56 at the base is desirable in that it enables the container to ride freely within the interior 2 of the pipe 1 and its path of movement is unimpeded notwithstanding the irregular contour of the pipe surface caused by the scale or other deposits 3. The diameter of the container at its edge portion 56 is such that there is relatively little distance between the scale deposit and the edge. Consequently when the cam 9 moves the scraper members 42 into a scraping operation such as shown in Fig. 2 the scrapings 57 are collected within the container 49 when the latter is pulled along the pipe.

The apparatus may be employed for the purpose of obtaining samples at any distance within the pipe as may be desired by simply inserting the end 6 of the cable for a predetermined distance. This distance will in part be determined by the length of the flexible spring conduit 16.

The apparatus herein described is simply constructed and permits the procurement of samples of scale or other deposits generally located at an inaccessible area within the interior of a piping system. It is especially useful for obtaining samples of scale from boiler tubes. The apparatus makes it possible, moreover, to obtain a standardized sample.

The apparatus is subject to some modification. For example, the scraper elements may be restored to their initial positions by means of springs (not shown). The manually operated levers likewise may be restored to their initial position by a suitable spring mechanism (not shown). The materials of construction can be varied. The flexible cable 6 can also be described as a high tensile strength rod or wire not subject to self-stretching or tightening as occurs in some wire or braided ropes, yet sufficiently rigid to slide in the conduit 16.

Other changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. Apparatus for removing samples of deposits from the inner wall of a pipe comprising a flexible conduit, a flexible cable axially reciprocable in said conduit, a scraper mount fastened to one end of said conduit, a wall scraper pivotally mounted on said mount for lateral movement with respect to said cable from a non-scraping position to a scraping position adjacent said wall, a cam member secured to said cable adjacent said scraper and adapted to cam said scraper in contact therewith outwardly to said scraping position, said cable being adapted for moving said cam member both into and out of a position supporting said scraper in said scraping position, a sample container loosely secured to said cam member, and means mounted adjacent the other end of said conduit for moving said cable axially a predetermined distance.

2. Apparatus for removing samples of deposits from the inner wall of a pipe comprising a sleeve member, a plunger adapted to reciprocate axially in said sleeve member, a flexible cable axially reciprocable in said sleeve member and secured at one end to said plunger, a flexible conduit for said cable fastened at one end to said sleeve member, a scraper mount fastened to the opposite end of said conduit, a plurality of wall scrapers pivotally mounted on said mount for movement from a non-scraping position to a scraping position adjacent said wall, a cam member secured to the other end of said cable and adapted to cam said scrapers in contact therewith outwardly from said cable to said scraping position, a sample container loosely secured to said cam member, said plunger reciprocation effecting a corresponding reciprocation of said cable and cam member so as to both cam said scrapers into said scraping position and permit return of said scrapers to said non-scraping position, and means for reciprocating said plunger in said sleeve.

3. Apparatus for removing samples of deposits from the inner wall of a pipe comprising a flexible conduit, a flexible cable axially reciprocable in said conduit, a scraper mount fastened to one end of said conduit, a wall scraper mounted on said mount for movement from a non-scraping position to a scraping position adjacent said wall, an actuating member secured to said cable and movable therewith to move said scraper to said scraping position and rigidly support it therein and to permit return of the scraper to said non-scraping position, said cable being adapted for moving said actuating member both into and out of its position supporting said scraper in said scraping position, and a sample container mounted in proximity to said scraper to collect a deposit removed thereby.

4. Apparatus for removing samples of deposits from the inner wall of a pipe comprising a flexible conduit, a flexible cable axially reciprocable in said conduit, a scraper mount fastened to one end of said conduit, a wall scraper mounted on said mount for movement from a non-scraping position to a scraping position adjacent said wall, an actuating member secured to said cable and movable therewith to move said scraper to said scraping position and rigidly support it therein and to permit return of the scraper to said non-scraping position, said cable being adapted for moving said actuating member both into and out of its position supporting said scraper in said scraping position, a sample container mounted in proximity to said scraper to collect a deposit removed thereby, and means mounted adjacent the other end of said conduit for moving said cable axially a predetermined distance.

References Cited in the file of this patent

UNITED STATES PATENTS

| | | |
|---|---|---|
| 66,387 | Pratt | July 2, 1867 |
| 379,564 | Davison | Mar. 20, 1888 |
| 906,560 | Reeser | Dec. 15, 1908 |
| 1,137,580 | Cole | Apr. 27, 1915 |
| 1,266,663 | Cihak | May 21, 1918 |
| 1,787,112 | King | Dec. 30, 1930 |
| 2,053,698 | Church | Sept. 8, 1936 |
| 2,344,778 | Keplinger | Mar. 21, 1944 |

FOREIGN PATENTS

| | | |
|---|---|---|
| 640,076 | Germany | Dec. 19, 1936 |